(12) United States Patent
Sasson et al.

(10) Patent No.: US 7,664,118 B2
(45) Date of Patent: Feb. 16, 2010

(54) SYSTEM AND METHOD FOR HIGH PRECISION CLOCK RECOVERY OVER PACKET NETWORKS

(75) Inventors: Israel Sasson, Raanana (IL); Alik Shimelmits, Rishon LeTzion (IL); Alon Stern, Kiryat Haim (IL); Yoram Henik, Shoham (IL); Ziv Barak, Rishon LeTzion (IL)

(73) Assignee: Axerra Networks, Inc., Tel Aviv (IL)

( * ) Notice: Subject to any disclaimer, the term of this patent is extended or adjusted under 35 U.S.C. 154(b) by 366 days.

(21) Appl. No.: 11/167,557

(22) Filed: Jun. 28, 2005

(65) Prior Publication Data

US 2006/0291479 A1 Dec. 28, 2006

(51) Int. Cl.
*H04L 12/56* (2006.01)
(52) U.S. Cl. ............... 370/395.62; 370/503; 375/354; 375/371
(58) Field of Classification Search ............ 370/395.62, 370/503
See application file for complete search history.

(56) References Cited

U.S. PATENT DOCUMENTS

| | | | |
|---|---|---|---|
| 6,363,073 B2 * | 3/2002 | Nichols | 370/395.62 |
| 6,400,683 B1 * | 6/2002 | Jay et al. | 370/229 |
| 6,643,612 B1 * | 11/2003 | Lahat et al. | 702/186 |
| 6,721,328 B1 * | 4/2004 | Nichols et al. | 370/395.62 |
| 7,106,758 B2 * | 9/2006 | Belk et al. | 370/503 |

* cited by examiner

*Primary Examiner*—Chirag G Shah
*Assistant Examiner*—Salvador E Rivas
(74) *Attorney, Agent, or Firm*—Law Offices of Edward Langer

(57) ABSTRACT

An innovative system and method for achieving high precision clock recovery, i.e. reconstruction of the clock signal having the same frequency, over a packet switched network. The proposed method utilizes a minimum network delay approach, which overcomes the problems caused by delay variation of the network and filters out network jitter, such as noise jitter and other "singular" anomalies causing latency deviations. Minimum network delay is defined herein as the time delay in which a packet remains in the network under assumption that all transmission queues through which the packet passes are empty.

8 Claims, 4 Drawing Sheets

SYSTEM AND METHOD FOR HIGH PRECISION CLOCK RECOVERY OVER PACKET NETWORKS

FIELD OF THE INVENTION

The present invention relates generally to a system and method for high precision clock recovery, i.e. reconstruction of the clock signal having the same frequency, over a packet switched network.

BACKGROUND OF THE INVENTION

Clock recovery is defined to be the reconstruction of timing information from digital data over packet switched networks. A packet switched network comprises various interfaces and layer protocols, whereas clock synchronization is usually maintained between physical connected interfaces and not maintained end-to-end. Hence, an accurate clock mechanism must be provided for services that require end-to-end clock synchronization (e.g. CES, Voice, Video, etc.) as well as for an end-to-end transmission of accurate timing information (e.g. cellular G3 applications).

The clock recovery mechanism over packet switched networks involves two basic procedures—generation of packets at the local site and reconstruction of the clock signal at the remote side. The first procedure generates packets carrying relevant information of the source clock (at the local side). These packets are transmitted to the remote side over the packet switched network. At the second procedure, reconstruction of the clock signal is obtained from the received information at the remote side.

A major problem in trying to synchronize a clock over a non-synchronized network while achieving a high precision clock accuracy is to compensate for delay variation or, in other words, to filter out network jitter affecting arriving packets. The delay in the network is a superposition of passive and active network factors. Passive network factors, such as fiber and cable, are usually constant physical factors, wherein their variation is very small and therefore can be neglected. However, active network factors, such as switches and routers, produce delay with significant variation that must be filtered out.

Several approaches known in the art are provided for clock recovery, trying to overcome the problem caused by delay variation.

IEEE 1588 standard refers to a precision clock synchronization protocol for networked measurement and control systems. This standard defines a protocol enabling precise synchronization of clocks in measurement and control systems implemented with technologies such as network communication, local computing and distributed objects. The protocol enables heterogeneous systems that include clocks of various inherent precision, resolution and stability to synchronize. The protocol further supports system-wide synchronization accuracy in the sub-microsecond range with minimal network and local clock computing resources.

The IEEE 1588 standard was developed for test equipment that is located on the same LAN. Therefore, packets are transmitted within the same network equipment, while assuming that a one-way direction of a specific packet equals exactly half the round trip delay.

This protocol enables transmission of the time stamp from the master unit to the slave unit. The slave unit takes an individual timestamp when receiving the packet and immediately re-transmits the packet back to the master unit. The master unit measures the round trip delay, thus assuming that each direction equals half the round trip delay. Based on this value, the master unit then instructs the slave unit on how to synchronize its clock.

However, it is not necessarily correct to assume that the round trip delay is comprised of two equal timed delays, wherein the time delay from a local site to a remote site equals the time delay from the remote site to the local site. For example, in networks that are asymmetrical in their nature, e.g. HFC or point-to-multipoint Ethernet radio networks, the time delay from the central site to a remote site does not equal the time delay from a remote site to the central site. This assumption becomes even more questionable when the network utilization reaches its capacity level.

The traditional approach to filter out network jitter calculates the average delay using statistical estimation. However, the main drawback of this approach is that the statistical estimation depends on active network utilization factors, consequentially presenting unstable average delay calculations.

U.S. Pat. No. 6,363,073 discloses a circuit and method for synchronizing a service clock at a destination node with a service clock at a source node for circuit emulation service over a packet network. The method includes receiving data packets from a source node of the destination node. At the destination node, the method removes from the data packets residual time-stamp (RTS) values that were created at the source node based on information received from the service clock at the source node. RTS values are stored in memory at the destination node. The method determines a majority count and a minority count of RTS values over a period of time from the RTS values stored in memory. The method further uses the majority and minority counts to set the frequency of a service clock at the destination node for use in receiving data packets.

Yet another method for overcoming delay variation provides an adaptive clock, in which the receiver buffers incoming traffic and compares the level of the buffer with a local clock. The level of the buffer is used to control the frequency of the clock, so that the clock controlling the destination node buffer must operate at a frequency precisely matched to that of the service signal input at the source node in order to avoid buffer overflow or underflow and resulting loss of data. However, this method suffers from significant limitations revealing inaccurate results, and is therefore less efficient.

The prior art using such a method for clock recovery in a packet network include U.S. Pat. No. 6,721,328 to Nichols et al. and U.S. Pat. No. 6,400,683 to Jay. This method is further disclosed in U.S. Pat. No. 6,363,073 to Nichols.

The first Nichols patent receives data packets at a destination node. The data packets are then stored in a buffer. The data packets are read out of the buffer by using a locally generated clock. The fill level of the buffer is monitored over a first period of time. A relative maximum fill for the buffer is identified during the first period of time. Further, the relative maximum fill level is used to control the frequency of the locally generated clock so as to control the rate at which data is read out of the buffer.

The Jay patent discloses a data communication network, in which a system clock rate can be inferred at a receiver by measuring the data rate during successive periods. This information is used to adjust or adapt a receiver output clock to the inferred system clock. To adapt a receiver buffer output clock frequency to the buffer input clock frequency, the level of the buffer is periodically monitored. If the fill level is greater than an upper threshold, the output clock frequency is incremented. If the fill level is less than a lower threshold, the output clock frequency is decremented. A count is maintained of the number of successive adjustment operations performed while the fill level overflows the range bounded by the thresholds. When the fill level returns to the bounded range, a number of reverse frequency adjustments are performed, thereby reducing oscillations.

Since a high precision clock recovery over a packet switched network is crucial for applications that require high accuracy clock at remote locations, it would be desirable to provide a system and method obtaining an accurate reconstruction of the clock having the same frequency in packet networks.

SUMMARY OF THE INVENTION

Accordingly, it is a principal object of the present invention to overcome the disadvantages of prior art techniques used for clock recovery over a packet switched network.

The present invention discloses an improved and efficient system and method for high precision clock recovery, i.e. reconstruction of the clock having the same frequency, over a packet switched network.

The proposed method, according to the preferred embodiment, is provided for achieving high precision clock recovery by utilizing a minimum network delay approach, which overcomes the problems caused by delay variation of the network and filters out network jitter.

In accordance with a preferred embodiment of the present invention, there is provided a system and method for high precision clock recovery over a packet switched network.

A preferred method of the invention comprises the steps of:

generating packets at a local unit carrying information to a remote unit using a local clock signal, wherein each generated packet carries a transmitted timestamp;

generating a remote timestamp at said remote unit for each of said generated packets;

providing a minimum network delay estimation for filtering out network jitter, wherein the minimum network delay estimation is defined as a time delay in which a packet remains in the packet switched network under assumption that all transmission queues in which the packet passes through are empty; and reconstructing a received clock signal having a same frequency as the local clock signal based on a time difference between the transmitted timestamp and the remote timestamp.

In accordance with another method of the present invention, the method further comprises the step of building at least one high frequency reference clock.

In accordance with another method of the present invention, the method further comprises the step of providing latency estimation for detecting minimum delay values, wherein each of the minimum delay values is the time difference between the transmitted timestamp and the remote timestamp over a time window.

In accordance with another method of the present invention, the method further comprises the step of converting each of the minimum delay values into a control word for obtaining an accurate received clock signal.

In accordance with another method of the present invention, the latency deviation estimation comprises the steps of:

obtaining an array containing 2N last minimum delay values, wherein N is an integer number;

applying two linear regression procedures on the array, wherein a first regression procedure is applied on N first minimum delay values and a second regression procedure is applied on N last minimum delay values; and calculating middle height difference of each of the two regression procedures;

detecting a latency deviation occurrence by checking whether the middle height difference is continuously increased x times and then continuously decreased y times, wherein x and y are threshold values, wherein a latency deviation value is defined as a peak value received from the two regression procedures.

In accordance with another method of the present invention, the network jitter includes noise jitter and other "singular" anomalies causing latency deviations.

Additional features and advantages of the invention will become apparent from the following drawings and description.

BRIEF DESCRIPTION OF THE DRAWINGS

For a better understanding of the invention with regard to an embodiment thereof, reference is made to the accompanying drawing, in which like numerals designate corresponding sections or elements throughout, and in which.

DETAILED DESCRIPTION OF A PREFERRED EMBODIMENT

The present invention discloses an innovative system and method for high precision clock recovery, i.e. reconstruction of the clock having the same frequency, over a packet switched network.

A major contributor to the delay variation of the active network elements derives from the equipments' transmission queue. The delay variation deriving from the transmit queues depends on the priority of the packet, the scheduling mechanism provided, the network and applicable queue utilization. Hence, network utilization, size of packets within the network as well as their priority are most important factors which affect the time a packet carrying clock information spends in the equipments' transmission queue.

The proposed method, according to the preferred embodiment, is provided for achieving high precision clock recovery by utilizing a minimum network delay approach, which overcomes the problems caused by delay variation of the network and filters out network jitter. The clock recovery system over packet switched networks involves two basic procedures—generation of packets (see FIG. 1) and reconstruction of the clock signal (see FIG. 2).

Figure 1:
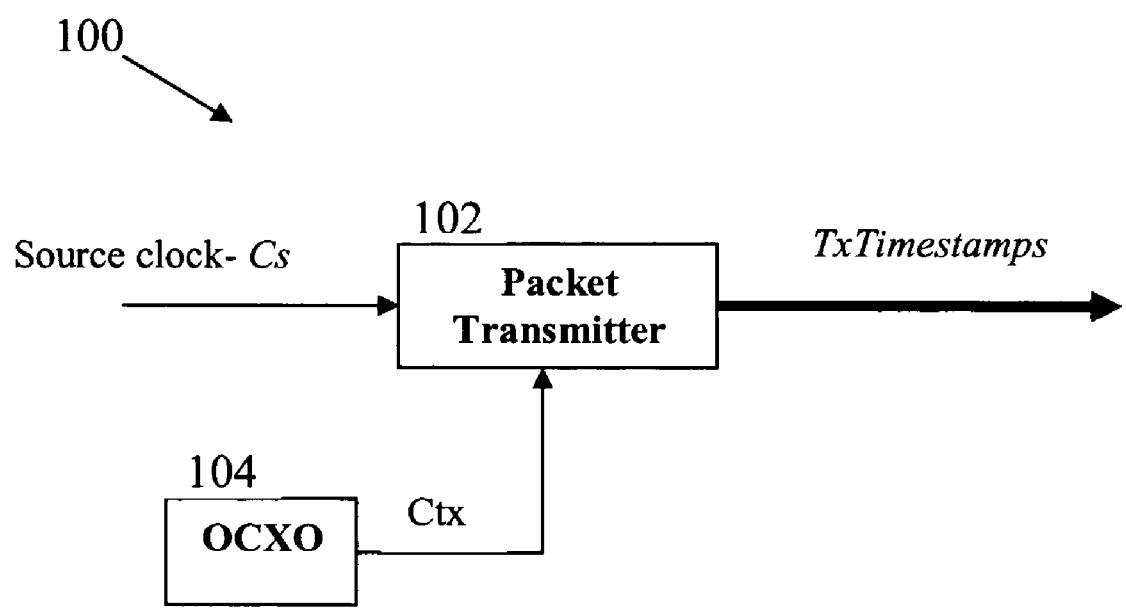
FIG. 1 shows a block diagram of a system for generating packets carrying clock information, constructed and operated in accordance with the principles of the preferred embodiment of the present invention.

Referring now to FIG. 1, there is shown a block diagram of a system 100 for generating packets carrying clock information, constructed and operated in accordance with the principles of the preferred embodiment of the present invention.

Generation of packets is provided for carrying clock information to a remote unit in relation to a source clock at the local side. A packet transmitter 102 generates packets at an interval of N msec, where the actual interval is counted using ticks/ pulses of the source clock Cs. Each generated packet carries a transmitted timestamp (Tx). Tx timestamp is calculated using a high frequency reference clock Ctx at the exact moment the packet is generated. This timestamp presents the exact time the packet was transmitted at the local side.

One of the ways to build such a reference clock is to use an Oven Controlled Crystal Oscillator (OCXO) unit 104.

In case the original source clock Cs is taken from a very stable source clock, such as Stratum 1 (per ANSI standard T1.101), this source clock itself can be used to build the reference clock Ctx.

Figure 2:
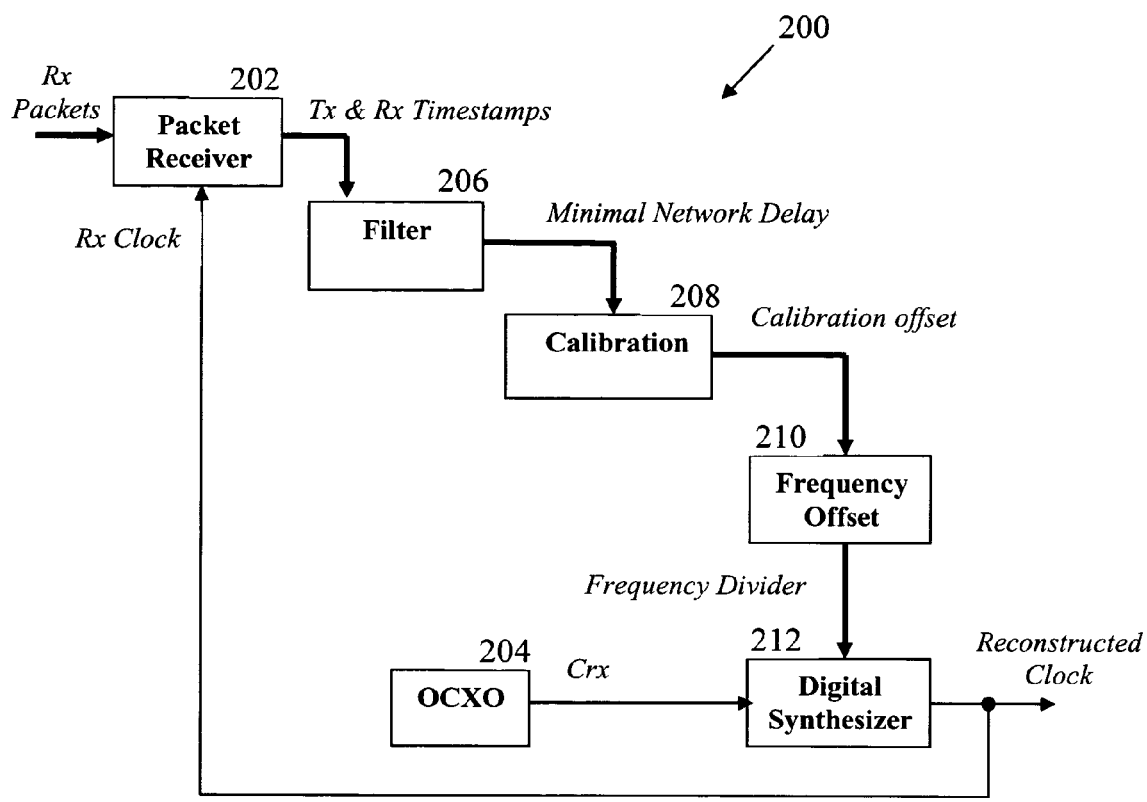
FIG. 2 shows a block diagram of a system for reconstructing a high precision clock from packets that are transmitted within a packet switched network, constructed and operated in accordance with the principles of the preferred embodiment of the present invention.

Referring now to FIG. 2, there is shown a block diagram of a system 200 for reconstructing a high precision clock from packets that are transmitted within a packet switched network, constructed and operated in accordance with the principles of the present invention.

In accordance with the preferred embodiment of the present invention, system 200 comprises an Oven Controlled Crystal Oscillator (OCXO) 204. OCXO 204 is provided for creating a reference clock Crx. After Crx is transmitted to Digital Synthesizer 212, a reconstructed clock Rx is obtained for generating remote timestamp Rx at the remote side.

A frequency difference between the two OCXO units 104 and 204 creates a time difference between Rx and Tx timestamps. Due to the stability of the two OCXO units 104 and 204, this time difference within the regression time window is small and almost constant when applying a clock recovery regression algorithm.

At the first phase, a packet receiver 202 at the remote side receives the network packets carrying clock information, i.e. Tx timestamp along with the locally generated remote timestamp Rx. Tx and Rx timestamps are then transmitted forward to a filter 206. Filter 206 receives the timestamps and filters out network jitter resulting from a superposition of the various network elements. Minimum network delay estimation (see FIG. 3) is provided for filtering out this unwanted network jitter.

At the second phase, signals carrying filtered clock information are transmitted to a calibration unit 208. Calibration unit 208 utilizes latency deviation estimation (see FIG. 4) for filtering out "singular" anomalies in the network latency. This estimation is obtained by calculating the difference between the frequency of the transmitted timestamp Tx and remote timestamp Rx, thus detecting minimum delay values over each time window. The calibration procedure is a long-term regression, which is carried out over a long period of time (approximately 40 minutes), in order to receive the necessary calibration precision.

Signals from the calibration unit 208 are then transmitted to a frequency-offset unit 210. Frequency-offset unit 210 is provided for converting each of these minimum delay values (i.e. the calculated time differences between the reference clock Ctx at the local side and the reference clock Crx at the remote side) into a control word, as required by digital synthesizer 212. The control word is updated every 500 ms and a simple average algorithm is used to improve the frequency accuracy beyond the LSB (Low Significant Bit) value of the digital synthesizer 212.

At the last phase, signals from the frequency-offset unit 210 are transmitted to digital synthesizer 212. Digital synthesizer 212 utilizes the control word for generation of the accurate reference clock Crx at remote side.

Figure 3:
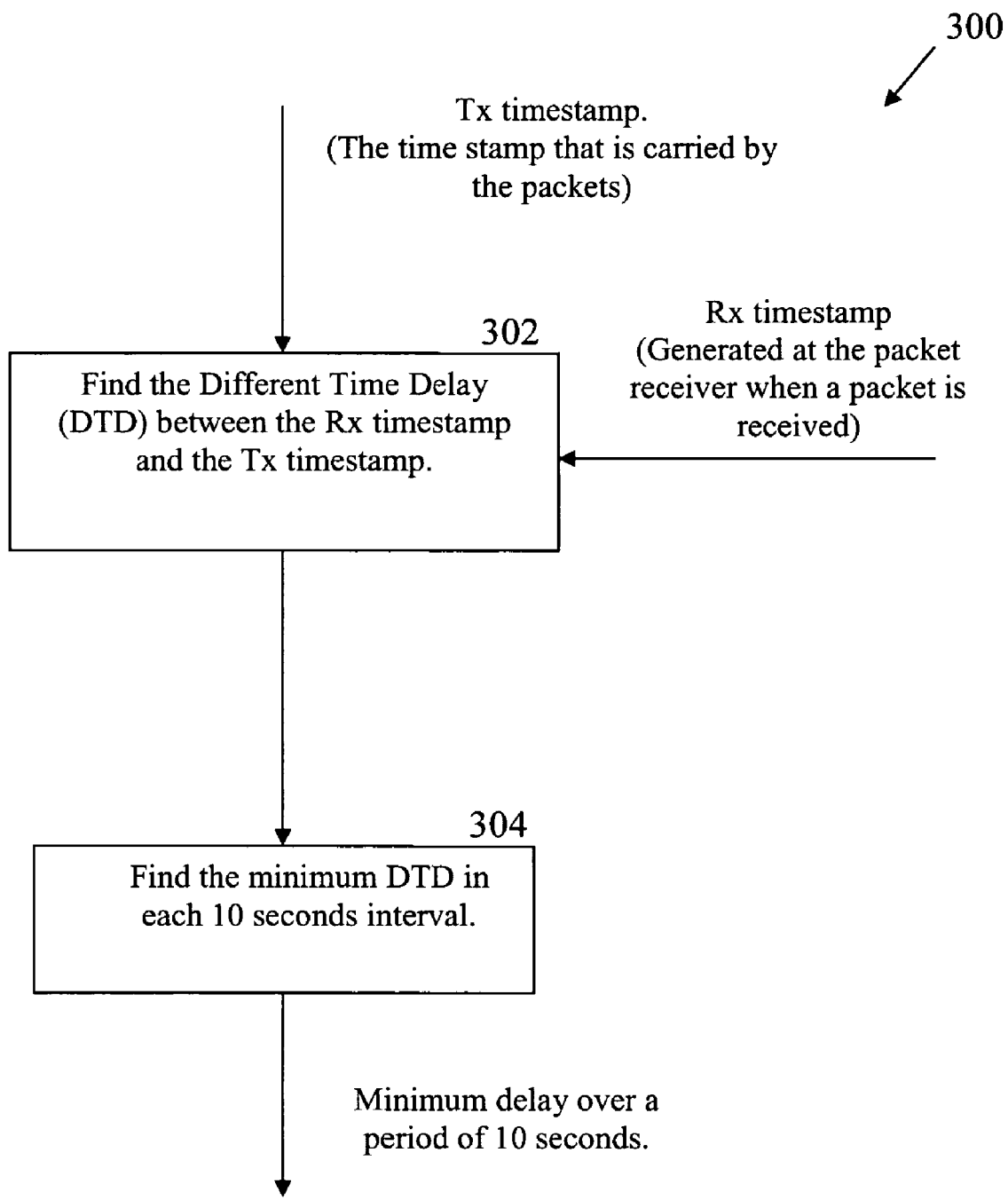
FIG. 3 is a flow chart of a minimum network delay estimation used in accordance with a preferred method of the present invention.

FIG. 3 is a flow chart of a minimum network delay estimation used in accordance with a preferred method of the present invention.

Minimum network delay is defined herein as the time delay in which a packet remains in the network, under assumption that all transmission queues through which the packet passes are empty. The proposed minimum network delay estimation determines a time delay based on constant physical factors while minimizing the dependency on network utilization restrictions. Consequently, more accurate and stable results are obtained. Furthermore, taking the minimum delay as a reference within a time window significantly reduces the negative effects created from the delay variation.

The minimum network delay estimation is provided for filtering out network jitter, such as noise jitter, essential for achieving a high precision clock recovery. Noise filtering is required for detecting large time deviations in the samplings. Such deviations may be a cause of a busy network, for example.

At the initial block 300, a remote unit receives arriving network packets carrying the packet's transmitted timestamp Tx and the remotely generated Rx timestamp. At block 302, a minimum delay value is provided. This value represents the time difference between Tx and Rx timestamps.

At block 304, in accordance with a preferred embodiment of the present invention, a minimum delay value is calculated at an interval of 10 seconds. The obtained minimum delay value is then used as input by the calibration unit 208 (see FIG. 2) as well as the latency change estimation (see FIG. 4).

Although the method as described above relates to minimum network delay estimation, the proposed method according to the present invention is provided for any other method using minimum delay estimations for filtering out network jitter and providing high precision clock recovery.

Figure 4:
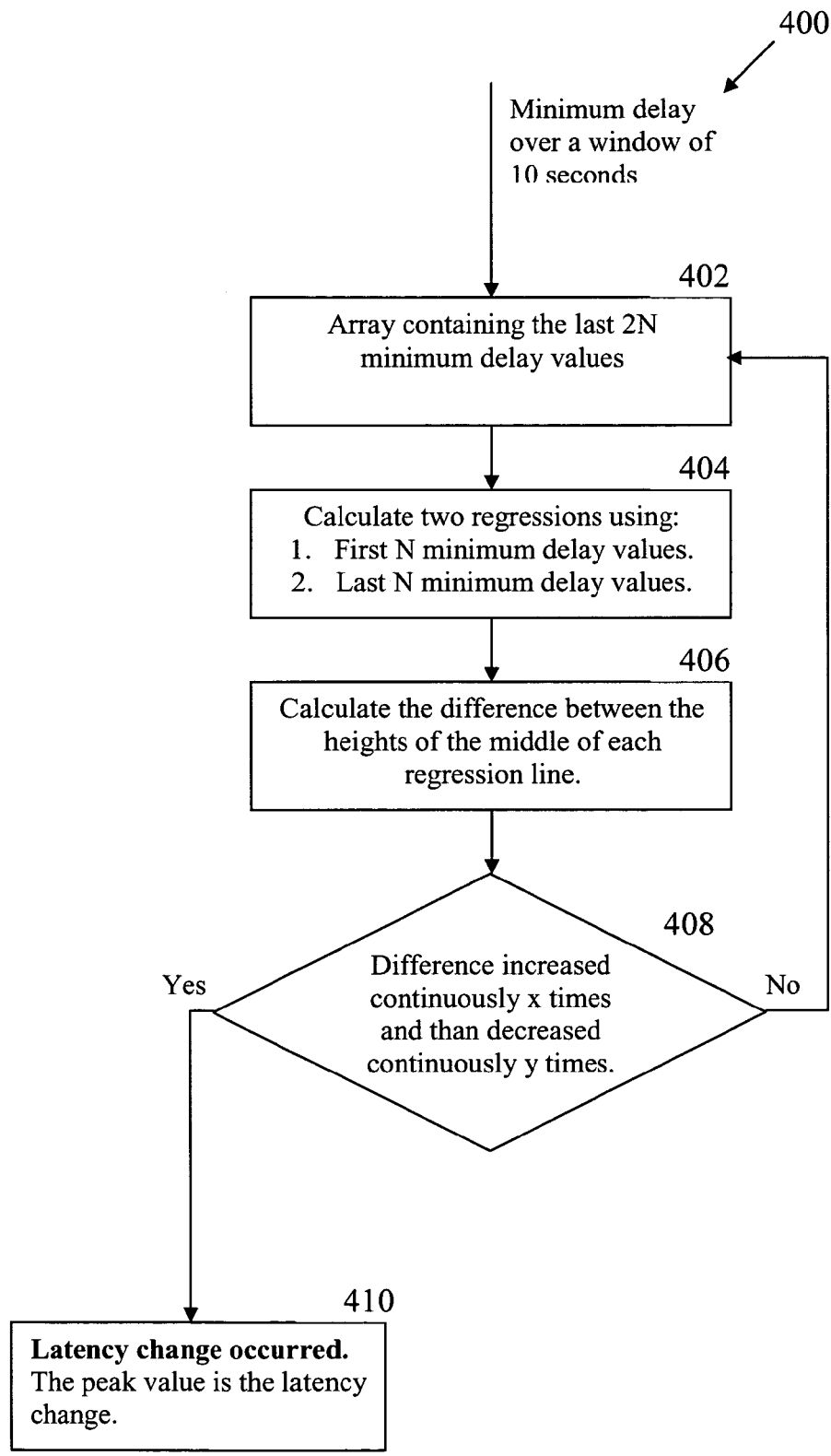
FIG. 4 is a flow chart of a latency deviation estimation procedure used in accordance with a preferred method of the present invention.

FIG. 4 is a flow chart of a latency deviation estimation procedure used in accordance with a preferred method of the present invention.

Latency deviation estimation is provided for filtering out other "singular" anomalies, which are required for handling latency deviations and restoring calibration values that have been unintentionally changed as a result. Latency deviations may result from singular network effects that change a network path between two elements in the network. Such network effects include, but are not limited to, protection switch, re-routing, link upgrades, etc.

The minimum delay value obtained in FIG. 3 is transmitted to block 400. At block 402, an array containing the last 2N minimum delay values is obtained. At block 404, two regression procedures are applied on a received array containing minimum delay values. The first regression procedure is applied on the first N minimum delay values, whereas the second regression procedure is applied on the last N minimum delay values.

Block 406 calculates the middle height difference of each regression line. In accordance with the preferred embodiment of the present invention, the variable N equals 13. Thus, each regression procedure takes 130 seconds. Increasing the value of N will lead to a slower response time and to a more accurate latency change value.

Block 408 checks whether the middle height difference is continuously increased x times and then continuously decreased y times, wherein x and y are threshold values. A latency change is detected only if more than x increasing values and more than y decreasing values are detected. In accordance with the preferred embodiment of the present invention, the variables x and y equal 10.

If this is not the case, the estimation procedure returns to proceed from block 402. However, in the affirmative case in block 410, a latency deviation has occurred. The latency deviation value is defined as the peak value received from the two regression procedures in block 406.

Although the method as described above relates to the latency deviation estimation procedure, the proposed method according to the present invention is provided for any other method of filtering out "singular" anomalies and handling latency deviations, thus obtaining high precision clock recovery.

It can be understood that other implementations are possible within the scope of the invention, thus relating to any system and method providing high precision clock recovery.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A method for high precision clock recovery over a packet switched network, said method comprising the steps of:
   generating packets at a local unit carrying information to a remote unit using a local clock signal, wherein each generated packet carries a transmitted timestamp;
   generating a remote timestamp at said remote unit for each said generated packet;
   providing a minimum network delay estimation for filtering out network jitter, wherein said minimum network delay estimation is defined as a time delay in which a packet remains in the packet switched network, assuming that all transmission queues through which said packet passes through are empty;
   reconstructing a received clock signal based on a time difference between said transmitted timestamp and said remote timestamp; and
   providing a latency estimation for detecting minimum delay values, wherein each of said minimum delay values is said time difference between said transmitted timestamp and said remote timestamp over a time window,
   wherein said latency deviation estimation comprises the steps of:
   obtaining an array containing 2N last minimum delay values, wherein N is an integer number;
   applying two linear regression procedures on said array, wherein a first regression procedure is applied on N first minimum delay values and a second regression procedure is applied on N last minimum delay values;
   calculating middle height difference of each of said two regression procedures; and
   detecting a latency deviation occurrence by checking whether said middle height difference is continuously increased x times and then continuously decreased y times, wherein x and y are threshold values, wherein a latency deviation value is defined as a peak value received from said two regression procedures.

2. The method of claim 1 further comprising the step of building at least one high frequency reference clock.

3. The method of claim 1 further comprising the step of converting each of said minimum delay values into a control word for obtaining an accurate received clock signal.

4. The method of claim 1, wherein providing said minimum network delay estimation step includes noise jitter and other "singular" anomalies causing latency deviations.

5. A system for high precision clock recovery over a packet switched network, said system comprising:
   means for generating packets at a local unit carrying information to a remote unit using a local clock signal, wherein each generated packet carries a transmitted timestamp;
   means for generating a remote timestamp at said remote unit for each said generated packet;
   means for obtaining minimum network delay estimation for filtering out network jitter, wherein said minimum network delay estimation is defined as a time delay in which a packet remains in the packet switched network, assuming that all transmission queues through which Said packet passes through are empty;
   means for reconstructing a received clock signal based on a time difference between said transmitted timestamp and said remote timestamp; and
   means for detecting minimum delay values, wherein each of said minimum delay values is defined as a latency estimation being said time difference between said transmitted timestamp and said remote timestamp over a time window,
   wherein said means for obtaining said latency deviation estimation operates in accordance with the steps of:
   obtaining an array containing 2N last minimum delay values, wherein N is an integer number;
   applying two linear regression procedures on said array, wherein a first regression procedure is applied on N first minimum delay values and a second regression procedure is applied on N last minimum delay values;
   calculating middle height difference of each of said two regression procedures; and
   detecting a latency deviation occurrence by checking whether said middle height difference is continuously increased x times and then continuously decreased y times, wherein x and y are threshold values, wherein a latency deviation value is defined as a peak value received from said two regression procedures.

6. The system of claim 5 further comprising at least one high frequency reference clock.

7. The system of claim 5 further comprising means for converting each of said minimum delay values into a control word for obtaining an accurate received clock signal.

8. The system of claim 5, wherein said providing said minimum network delay estimation step includes noise jitter and other "singular" anomalies causing latency deviations.

* * * * *